United States Patent [19]

Komatsu

[11] Patent Number: 4,847,714
[45] Date of Patent: Jul. 11, 1989

[54] MAGNETIC HEAD ADJUSTING DEVICE FOR A DOUBLE CASSETTE TAPE PLAYER

[75] Inventor: Norimasa Komatsu, Kakuda, Japan

[73] Assignee: Alps Electric Co., Ltd., Japan

[21] Appl. No.: 131,857

[22] Filed: Dec. 11, 1987

[30] Foreign Application Priority Data

Mar. 9, 1987 [JP] Japan ............................ 62-34281[U]

[51] Int. Cl.$^4$ .............................................. G11B 5/56
[52] U.S. Cl. ........................................ 360/109; 360/92
[58] Field of Search .................... 360/92, 109, 91, 105; 379/70, 83

[56] References Cited

U.S. PATENT DOCUMENTS

| | | | |
|---|---|---|---|
| 3,431,367 | 3/1969 | Nickl | 360/92 |
| 3,584,879 | 6/1971 | Ban | 360/92 |
| 4,584,435 | 4/1986 | Jacobson | 379/83 |
| 4,698,705 | 10/1987 | Umino | 360/92 |

Primary Examiner—Stuart N. Hecker
Assistant Examiner—David J. Severin
Attorney, Agent, or Firm—Guy W. Shoup; Paul J. Winters; Stephen L. Malaska

[57] ABSTRACT

A magnetic head adjusting device for a double cassette tape player wherein a single magnetic head is used commonly and alternately for a pair of cassette loading stations and azimuth adjustment of the common magnetic head can be effected individually at the two cassette loading stations. The device comprises a head base mounted for movement between a pair of cassette loading stations on a chassis, a resilient support member secured to the head base, a single magnetic head carried on the resilient support member, and an adjusting member located at each of the cassette loading stations for adjustably changing, against the resilient force of the resilient member, the inclination of the magnetic head moved to the cassette loading station together with the head base.

12 Claims, 8 Drawing Sheets

MAGNETIC HEAD ADJUSTING DEVICE FOR A DOUBLE CASSETTE TAPE PLAYER

BACKGROUND OF THE INVENTION

This invention relates to a double cassette tape player which is employed in a telephone answering device or the like and alternately operates a pair of cassette tapes loaded thereon, and more particularly to a magnetic head adjusting device for a double cassette tape player wherein a common magnetic head can be moved alternately to one or the other of a pair of cassette loading stations and besides the azimuth adjustment of the magnetic head can be made individually at each of the cassette loading stations.

In a tape player of the double cassette type which is generally used for a telephone answering device or the like, a pair of cassette tapes loaded are driven alternately. This is because one of the cassette tapes is provided for playback of the outgoing announcement and the other is provided for recording and playback of the incoming messages.

Figure 10:
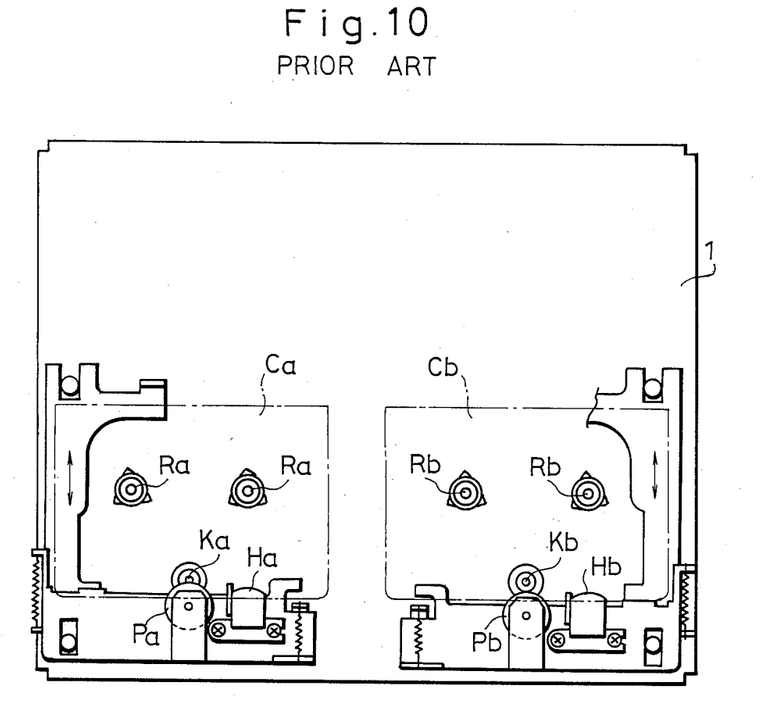
FIG. 10 is a plan view showing an exemplary conventional double cassette tape player.

FIG. 10 shows a drive unit of an examplary one of such double cassette tape players for use with a telephone answering device.

The double cassette tape player shown in FIG. 10 utilizes a pair of cassette halves Ca, Cb of the micro size. The two cassette halves Ca, Cb are loaded on spindles Ra, Rb at a pair of cassette loading stations located on a chassis 1. The cassette loading stations has a pair of capstans Ka, Kb and a pair of pinch rollers Pa, Pb located therein. A pair of magnetic heads denoted at Ha and Hb are also provided separately for the individual cassette loading stations.

As described just above, the drive unit of the double cassette tape player includes two magnetic heads one for each of the cassette loading stations. Where such a double cassette tape player is used for a telephone answering device, the two cassette loading stations are driven not simultaneously but alternately, and generally the double cassette tape player includes only one amplifier. Accordingly, in order to attain good balancing of volumes of playback sounds of the two cassette halves loaded, the two magnetic heads Ha, Hb must be selected as parts upon production such that they may have a minimum difference in characteristics. Therefore, it is a drawback that operation of selecting magnetic heads is complicated and assembling and adjusting operation is difficult. Besides, provision of two magnetic heads for a drive unit of a single tape player requires an increased number of parts and a high production cost accordingly.

Such disadvantages as described above which are derived from provision of two magnetic heads may be eliminated by an alternative construction wherein a single magnetic head is moved alternately to one or the other of two cassette loading stations so as to use the single magnetic head commonly for a pair of cassette halves. However, where two cassette loading stations are provided, the cassette halves loaded at the two cassette loading stations are apt to cause variations in vertical positions thereof or in inclination of tapes being fed. Therefore, where a single magnetic head is moved for common use for two cassette halves, if the magnetic head is adjusted with respect to the tape position and the tape feeding angle of one of the cassette halves, the gap position of the core of the magnetic head might not be compatible, when the magnetic head is moved to the other cassette half, with the feeding condition of the other tape. In this manner, where a common magnetic head is used, azimuth adjustment cannot be effected for individual cassette halves.

SUMMARY OF THE INVENTION

Accordingly, it is an object of the present invention to provide a magnetic head adjusting device for a double cassette tape player wherein a single magnetic head is used commonly and alternately for a pair of cassette loading stations and azimuth adjustment of the common magnetic head can be effected separately at the individual cassette loading stations.

In order to attain the object, according to the present invention, a magnetic head adjusting device for a double cassette tape player wherein a pair of cassette loading stations each including a pair of spindles and a capstan are provided on a chassis comprises a head base mounted for movement between the cassette loading stations on the chassis, a resilient support member secured to the head base, a single magnetic head mounted on the resilient support member, and an adjusting member located at each of the cassette loading stations for adjustably changing, against the resilient force of the resilient support member, the inclination of the magnetic head moved to the cassette loading station together with the head base.

In the magnetic head adjusting device according to the present invention, the head base is moved alternately from one to the other of the two cassette loading stations or vice versa in order to allow the magnetic head on the head base to be used commonly for cassette halves loaded at the cassette loading stations. While the magnetic head on the head base is at a position in either of the cassette loading stations, the adjusting member located at the cassette loading station can be adjusted in vertical position so as to incline the magnetic head on the head base against the force of the spring member. By effecting such azimuth adjustment at each of the cassette loading stations, the commonly used single magnetic head can be made compatible with feeding conditions of magnetic tapes within the individual cassette halves.

Therefore, according to the present invention, selecting operation of magnetic heads need not be made severe since a single magnetic head can be used commonly for a pair of cassette halves. Further, the quantity of magnetic heads can be minimized, which allows reduction in production cost of double cassette tape players. Besides, while a single common magnetic head is used, azimuth adjustment of the magnetic head can be effected individually for a pair of cassette loading stations, which allows a pair of cassette halves to be driven individually in a best condition.

The above and other objects, features and advantages of the present invention will become apparent from the following description and the appended claims, taken in conjunction with the accompanying drawings.

DETAILED DESCRIPTION OF THE PREFERRED EMBODIMENTS

FIGS. 1 to 7 show a drive unit of a double cassette tape player in which a magnetic head adjusting device according to a first preferred embodiment of the present invention is incorporated. The cassette drive unit shown is incorporated in a telephone answering device in which a pair of cassette halves of the micro size are to be loaded.

Figure 1:
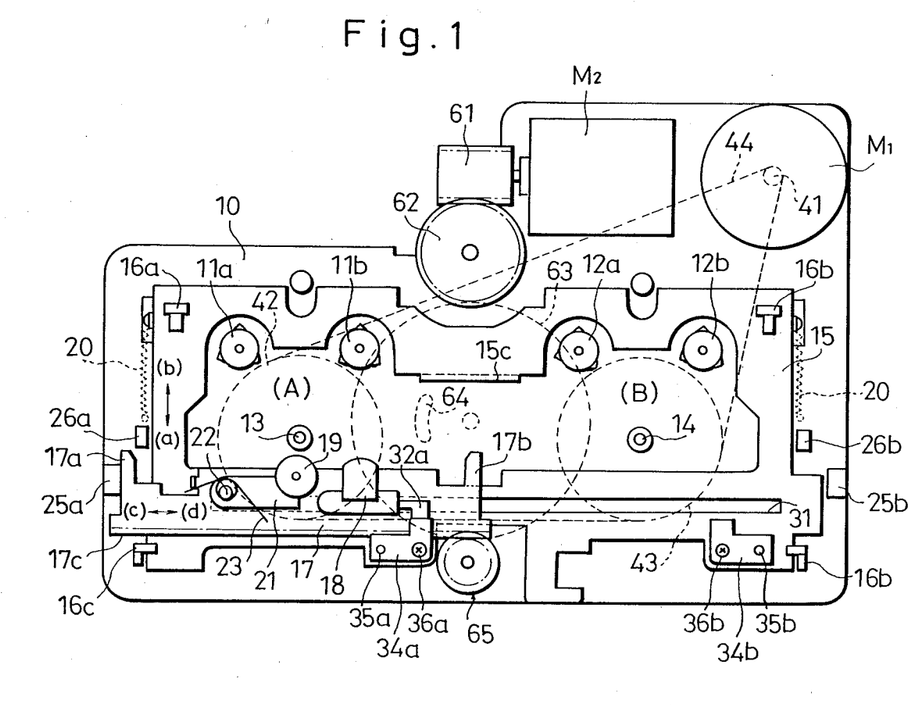
FIG. 1 is a plan view showing a drive unit of a double cassette tape player in which a magnetic head adjusting device according to a preferred embodiment of the present invention is incorporated.
Figure 5:
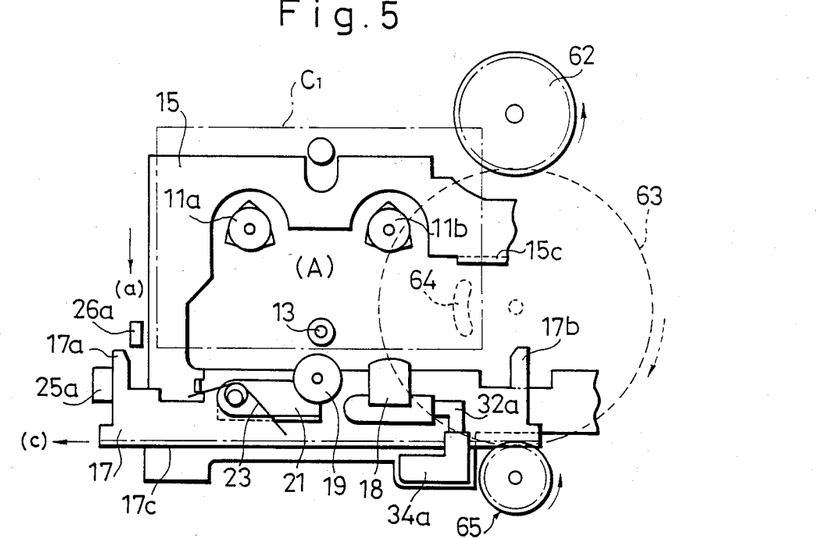
FIGS. 5 and 6 are partial plan views showing a head base in different positions when a left-hand side one of cassette halves is driven on the drive unit of FIG. 1.
Figure 6:
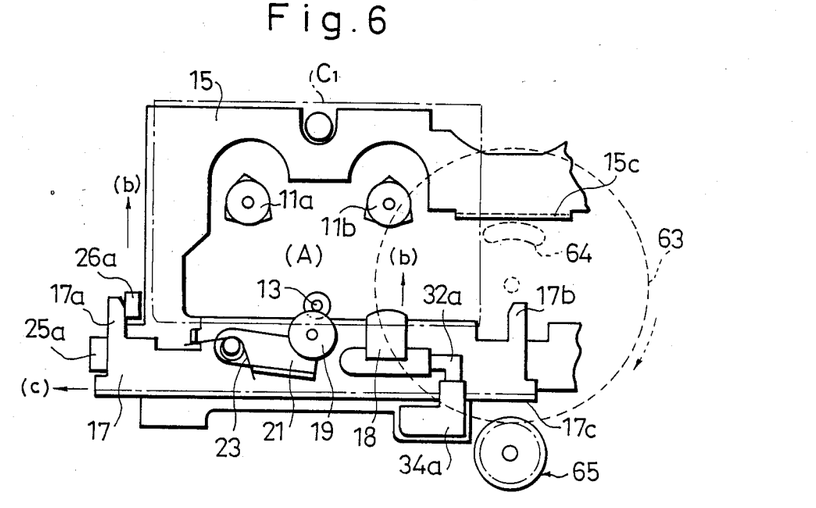

Referring first to FIG. 1, the drive unit shown includes a chassis 10 on which two cassette loading stations A and B are provided at left and right locations. A pair of spindles 11a, 11b and a capstan 13 are located at the left-hand side cassette loading station A, and another pair of spindles 12a, 12b and another capstan 14 are located at the right-hand side cassette loading station B. As seen in FIGS. 5 and 6, a cassette half $C_1$ is loaded at the left-hand side cassette loading station A while another cassette half $C_2$ not shown is loaded at the right-hand side cassette loading station B. The cassette halves $C_1$ and $C_2$ are loaded in a juxtaposed relationship in such an orientation that tape exposing portions thereof are directed downwardly in FIG. 1.

A support member 15 is located on the chassis 1. The support member 15 extends over the total length of both the cassette loading stations A and B and is supported for sliding movement in a direction (a)-(b) under the guidance of four guide tabs 16a to 16d mounted on the chassis 10. A pair of springs 20 extend between the support member 15 and the chassis 10 for biasing the support member 15 in the direction (a). The support member 15 has a guide slot 31 formed therein and extending in a leftward or rightward direction in FIG. 1, and a head base 17 is mounted for guided reciprocal movement in the leftward or rightward direction (in a direction (c)-(d) along the guide slot 31 on the support member 15.

Figure 3:
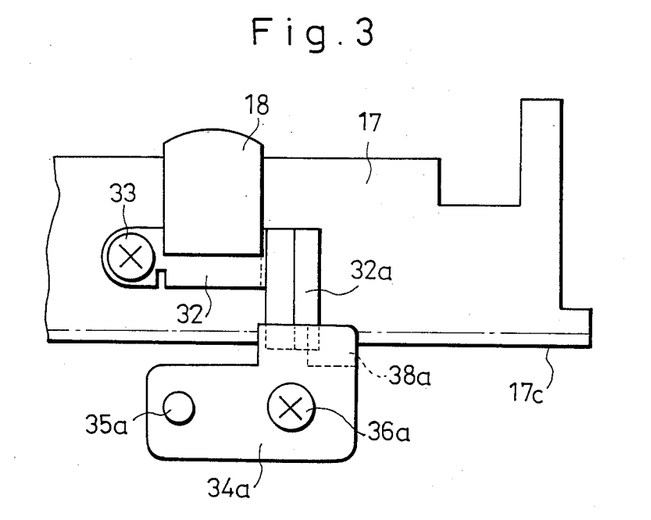
FIG. 3 is a plan view of the magnetic head adjusting device of FIG. 2.
Figure 4:
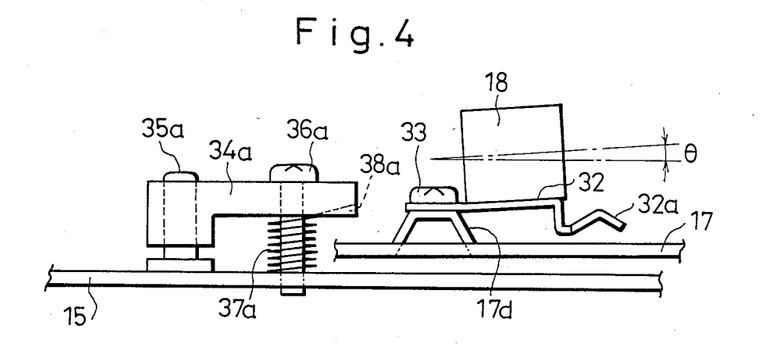
FIG. 4 is a front elevational view of the magnetic head adjusting device of FIG. 2.

A single magnetic head 18 is secured to the head base 17. In particular, as shown in enlarged views of FIGS. 2 to 4, the magnetic head 18 is securely mounted on a spring plate 32. A left end of the spring plate 32 is secured to a mounting protrusion 17d of the head base 17 by means of a fastening screw 33. The spring plate 32 has an angularly bent control piece 32a formed at a right end thereof. As seen in FIG. 4, the spring plate 32 is shaped so as to be sloped slightly upwardly toward the free end thereof so that the magnetic 18 may be arranged with an initial inclination indicated by $. The initial inclination angle $ is set to a forecast maximum angular range of the azimuth adjustment and, for example, to 3 degrees or so.

Figure 2:
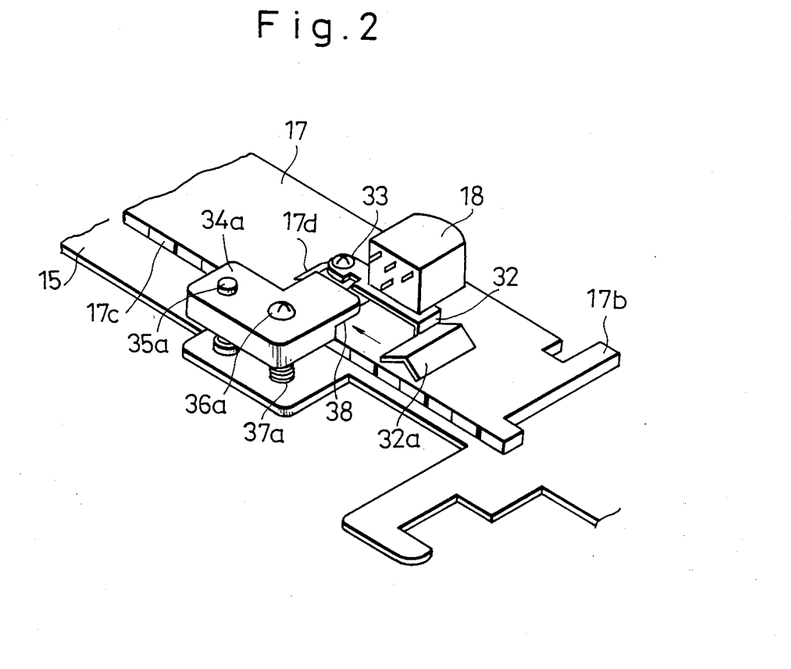
FIG. 2 is a partial plan view showing the magnetic head adjusting device of FIG. 1.

Meanwhile a pair of adjusting members 34a, 34b are located in a spaced relationship on the head base 15. FIGS. 2 to 4 show the leftwardly located adjusting member 34a. The adjusting member 34a is supported for sliding movement on a supporting pin 35a mounted on the support member 15. An adjusting screw 36a is screwed into the support member 15 and extends through the adjusting member 34a, and a coil spring 37a is fitted around the adjusting screw 36a and interposed between the support member 15 and the adjusting member 34a. Thus, by turning the adjusting screw 37a, the vertical position of the adjusting member 34a is adjusted relative to the support member 15. An inclined guide face 38a if formed at a right end portion of a lower surface of the adjusting member 34a. When the had base 17 is moved in the direction (c) to its limit position, the control piece 32a of the spring plate 32 on which the magnetic head 18 is carried is engaged with and slidably moved along the inclined guide face 38a of the adjusting member 34a until it is positioned just below the adjusting member 34a. On the other hand, the other adjusting member 34b located on the right-hand side in FIG. 1 is formed in a just symmetrical relationship to the left-hand side adjusting member 34a. The adjusting member 34b is also supported for sliding movement on a supporting pin 35b so that the vertical position thereof may be adjusted by an adjusting screw 36b. Thus, as the head base 17 is moved in the direction (d) to its limit position, the control piece 32a at the free end of the spring plate 32 comes to a position just below the adjusting member 34b.

A single pinch roller 19 is located on the head base 17. The pinch roller 19 is carried on a roller holder 21 which is supported for pivotal motion on the head base 17 by means of a support shaft 22. The roller holder 21 is normally biased in a counterclockwise direction by a spring 23. The head base 17 has an end tab 17a formed at a left end thereof and another end tab 17b formed at a right end thereof. Meanwhile, the chassis 10 has a stop 25a and a guide 26a formed at a left end portion thereof and another stop 25b and another guide 26b formed at a right end portion thereof. The stops 25a, 25b and the guides 26a, 26b have a height sufficient for them to engage with the end tabs 17a, 17b on the head base 17.

A main motor $M_1$ and an assist motor $M_2$ are mounted on the chassis 10. The main motor $M_1$ is provided for driving the capstans 13, 14 while the assist motor $M_2$ is provided for driving the head base 17 and the support member 15. As seen in FIG. 1, the left-hand side capstan 13 is formed in an integral relationship with a flywheel 42 located on a rear side of the chassis 10, and the right-hand side capstan 14 is formed in an integral relationship with another flywheel 43 located on the rear side of the chassis 10. A belt 44 extends between and around the flywheels 42, 43 and a pulley 41 mounted on a drive shaft of the main motor $M_1$ so that as the main motor $M_1$ rotates forwardly or reversely, the flywheels 42, 43 and the capstans 13, 14 are driven to rotate in a clockwise direction or in a counterclockwise direction.

Further, though not shown, a reel gear is provided in an integral relationship on each of the spindles 11a, 11b and 12b. Thus, power of the capstans 13, 14 are transmitted individually to the respective reel gears by way of rockable gears so that the spindles 11a to 12b may be driven to rotate in accordance with an operation mode of the player.

Meanwhile, a worm gear 61 is mounted on a drive shaft of the assist motor $M_2$ located on the chassis 10 and is held in meshing engagement with a transmission gear 62 which is in turn held in meshing engagement with a change-over gear 3 located on the rear side of the chassis 10. A drive cam 64 is formed in an integral relationship on an upper face of the change-over gear 63. A bent driving piece 15c is formed at a central portion of the support member 15 and located such that as the change-over gear 63 is rotated, it may be pushed by the drive cam 64 of the change-over gear 63. In other words, as the change-over gear 62 is rotated, the support member 15 is pushed in the direction (b) by the drive cam 64.

A head base driving gear 65 is further located on the chassis 10. The head base driving gear 65 has an upper gear and a lower gear between which a slip mechanism is provided. The lower gear of the head base driving gear 65 is held in meshing engagement with the change-over gear 63 while the upper gear is held in meshing engagement with a rack 17c formed on a lower edge portion of the head base 17 in FIG. 1.

Now, operation of the drive unit will be described.

When the cassette half $C_1$ loaded at the left-hand side cassette loading station A is to be driven, the transmission gear 62 is driven to rotate in the counterclockwise direction by the assist motor $M_2$. Consequently, the change-over gear 63 held in meshing engagement with the transmission gear 62 is rotated in the clockkwise direction so that the head base driving gear 65 held in meshing engagement with the change-over gear 63 is rotated in the counterclockwise direction. Accordingly, the upper gear of the head base driving gear 65 drives the rack 17c to move in the leftward direction in FIG. 1 to move the head base 17 in the direction (c). The head base 17 is moved to a position in which the magnetic head 18 and the pinch roller 19 thereon oppose to the tape exposing portion of the left-hand side cassette half $C_1$ as shown n FIG. 5. Upon leftward movement of the head base 17 in the direction (c), a left edge of the end tab 17a thereof is engaged with the opposing stop 25a so that the head base 17 is stopped at this position. Even after stopping of the head base 17, the assist motor $M_2$ continues to rotate. Consequently, the change-over gear 63 continues to rotate in the clockwise direction so that the lower gear of the head base 65 continues to be driven to rotate by the change-over gear 63. However, since the head base 17 held in meshing engagement with the upper gear of the head base 65 is engaged with the stop 25a and cannot be moved any more in the direction (c), the lower gear of the head base driving gear 65 slips relative to the upper gear. Due to such slip, the change-over gear 63 is allowed to continue to rotate in the clockwise direction until the drive cam 64 on the change-over gear 63 is engaged with the driving piece 15c of the support member 15 even after the head base 17 is stopped by the stop 25a. Thus, the support member 15 is pushed to move in the direction (b) against the force of the springs 20 by the drive cam 64 as shown in FIG. 6. Accordingly, the head base 17 on the support member 15 is also moved in the direction (b) because the end tap 17thereon is guided by and moves between the stop 25a and the guide 26a. Finally, the magnetic head 18 on the head base 17 is contacted with the tape within the cassette half $C_1$ while the tape is pressed against the capstan 13 by the pinch roller 19.

As shown in FIGS. 5 and 6, as the head base 17 is moved in the direction (c) to its limit position, the control piece 32a of the spring plate 32 on which the magnetic head 18 is carried enters just below the adjusting member 34a located on the support member 15 (refer to FIG. 3). If the adjusting screw 36a is turned while the support member 15 is at the position moved in the direction (b) as shown in FIG. 6, the vertical position of the adjusting member 34a relative to the support member 15 is adjusted. In accordance with a change in vertical position of the adjusting member 34a, the control piece 32a of the spring plate 32 is controlled against the spring force of the spring plate 32 itself to change the inclination angle $ of the spring plate 32 and the magnetic head 18 (refer to FIG. 4) thereby to effect azimuth adjustment of the magnetic head 18 relative to the magnetic tape within the cassette half $C_1$ loaded at the cassette loading station A.

When the cassette half $C_1$ is to be driven, the main motor $M_1$ is driven to rotate the left-hand side fly wheel 42 and capstan 13 is in the clockwise direction while the magnetic head 18 is in contact with the tape and the pinch roller 19 is pressed against the capstan 13 via the tape as shown in FIG. 6. In this instance, the left-hand side spindle 11a is driven to rotate in the clockwise direction by a mechanism not shown so that the magnetic tape is taken up by the spindle 11a, thereby effecting playback or recording by the magnetic head 18.

In this condition, when the other cassette half $C_2$ not shown loaded at the right-hand side cassette loading station B is to be driven subsequently, at first the assist motor $M_2$ is driven to rotate reversely. Consequently, the change-over gear 63 is rotated in the counterclockwise direction via the transmission gear 62 thereby to allow the support member 15 to be returned from the position shown i FIG. 6 to the position shown in FIG. 5 by the springs 20. After then, as the head base driving gear 65 held in meshing engagement with the change-over gear 63 is driven to rotate in the clockwise direction, the head base 17 is moved in the direction (d) by the upper gear of the head base driving gear 65 (refer to FIG. 7). As the head base 17 is moved further in the direction (d) from the position shown in FIG. 7 to its limit position in which the right-hand side end tab 17b thereof is engaged with the stop 25b on the chassis 1, the support member 15 is moved in the direction (b) again by rotation of the change-over gear 63 until the magnetic head 18 is contacted with the magnetic tape within the cassette half $C_2$ not shown loaded at the right-hand side cassette loading station B and the tape is pressed against the capstan 14 by the pinch roller 19.

Figure 7:
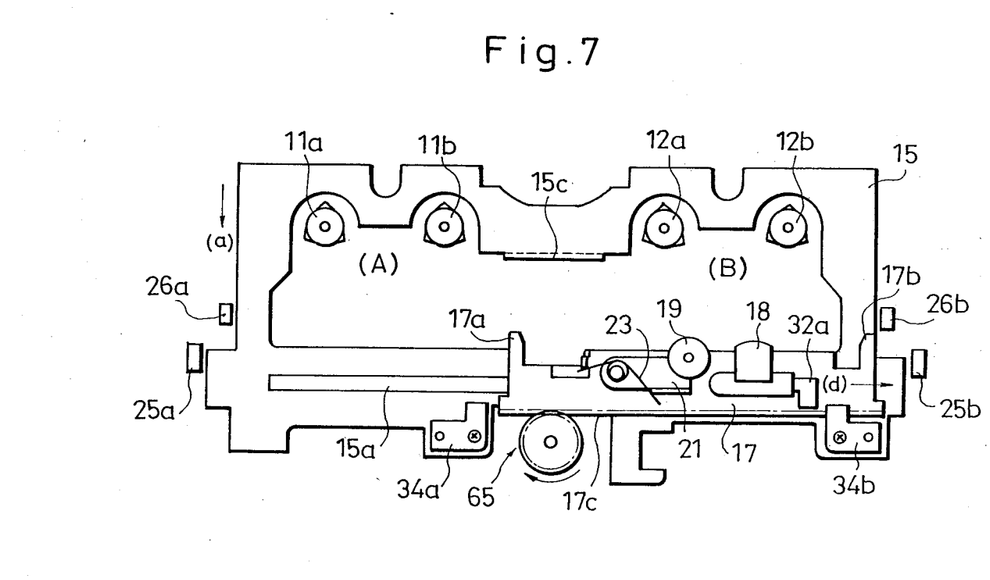
FIG. 7 is a plan view showing the head base of FIG. 5 during rightward movement.

Upon movement of the head base 17 is the direction (d) to its limit position, the control piece 32a of the spring plate 32 on which the magnetic head 18 is carried enters just below the right-hand side adjusting member 34b. Thus, if the adjusting screw 36b is turned in this condition, the vertical position of the adjusting member 34b relative to the support member 15 is adjusted. Consequently, as in the case of the left-hand side adjusting member 34a, the control piece 32a of the spring plate 32 is pressed by the adjusting member 34b to change the inclination angle $ of the spring plate 32 and the magnetic head 18 thereby to effect azimuth adjustment of the magnetic head 18 relative to the cassette half $C_2$ *not shown loaded at the cassette loading station B.*

Thus, when the right-hand side cassette half $C_2$ is to be driven to effect recording or playback thereof, the main motor $M_1$ is driven to rotate the capstan 14 as well as the spindle 2a.

Figure 8:
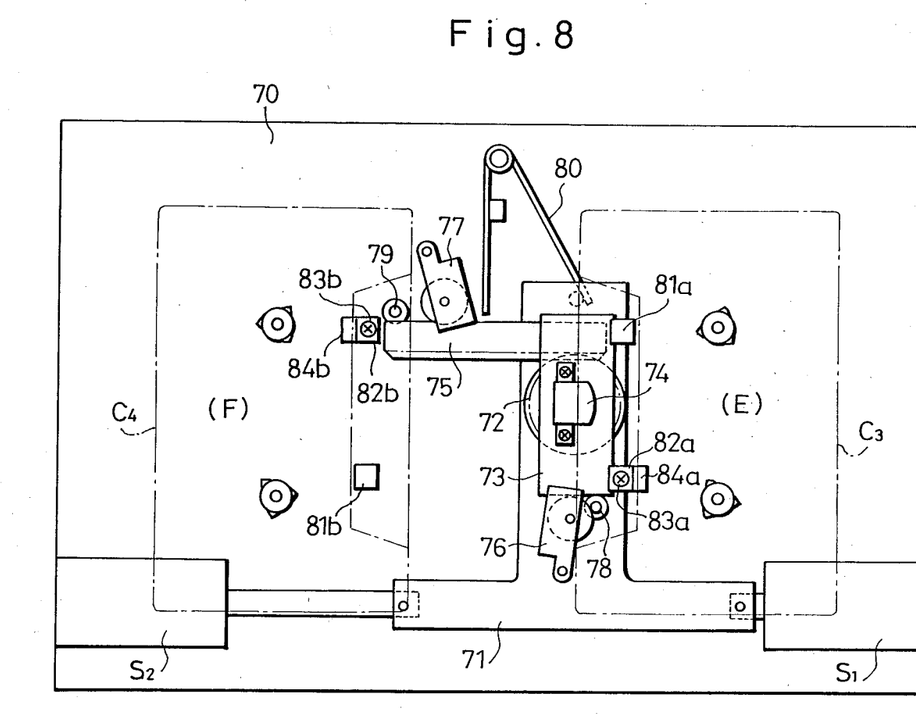
FIG. 8 is a plan showing another double cassette tape player in which a magnetic head adjusting device according to a second preferred embodiment of the present invention is incorporated.
Figure 9:
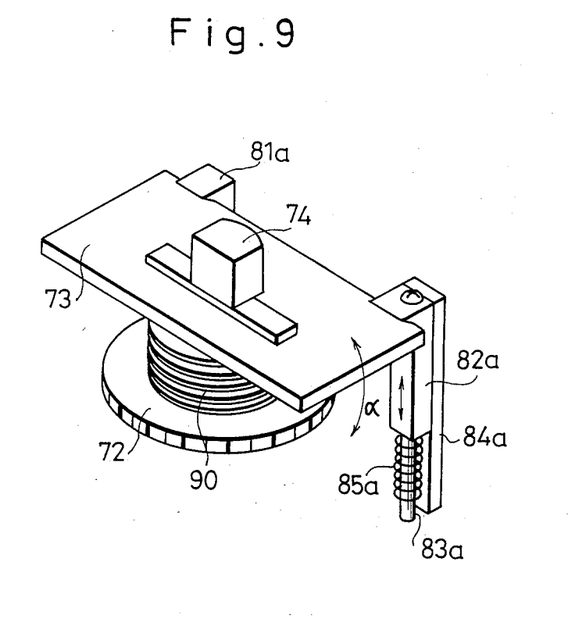
FIG. 9 is a perspective view showing the magnetic head adjusting device of FIG. 8.

Referring now to FIGS. 8 and 9, there is shown another double cassette tape player in which a magnetic head adjusting device according to a second preferred embodiment of the present invention is incorporated. The double cassette tape player shown in FIG. 8 includes a pair of cassette loading sections E and F located on a chassis 70. A pair of cassette halves $C_3$ and $C_4$ of the normal size are loaded at the cassette loading stations E, F with their tape exposing sides opposed to each other. A head base 71 is supported for movement in a rightward or leftward direction in FIG. 8 on the chassis 70, and a pair of solenoids $S_1$ and $S_2$ are connected for moving the head base 71 in the rightward and leftward directions in FIG. 8, respectively. A change-over gear 72 is supported for rotation on the head base 71, and a head support member 73 is located above the change-over gear 72 and carries a magnetic head 74 thereon. The head support member 73 is mounted for pivotal motion together with the change-over gear 72. A rack 75 is secured to the chassis 70 and held in meshing engagement with the change-over gear 72. In FIG. 8, the head base 71 is shown at its rightwardly moved position by excitation of the right-hand side solenoid $S_1$. As the head base 71 is moved in the rightward direction by the solenoid $S_{d\ 1}$, the change-over gear 72 held in meshing engagement with the rack 75 is rotated in the counterclockwise direction until the magnetic head 74 on the head support member 73 is contacted with the tape within the right-hand side cassette half $C_3$. Meanwhile, a right-hand side pinch roller 76 is pushed by the head base 71 and pressed against a right-hand side capstan 78. On the contrary, when the head base 71 is moved leftwardly by the left-hand side solenoid $S_2$, the change-over gear 72 on the head base 7 held in meshing engagement with the fixed rack 75 is rotated in the clockwise direction to pivot the head support member 73 also in the clockwise direction. As the head base 71 is fully moved in the leftward direction, the head support member 73 is pivoted by an angle of 180 degrees until the magnetic head 74 thereon is contacted with the magnetic tape within the cassette half $C_4$ loaded at the cassette loading station F. Thereupon, a left-hand side pinch roller 77 is pressed against a capstan 79. It is to be noted that when both the solenoids $S_1$ and $S_2$ are both in a non-excited condition, the head base 71 is returned by a spring 80 to its neutral position in which the magnetic head 74 is directed downwardly in FIG. 8 and thus spaced away from both the cassette halves $C_3$ and $C_4$.

In the present embodiment, a coil spring 90 is interposed between the integrally rotatable change-over gear 72 and head support member 73 as shown in FIG. 9 in order to allow the vertical position of the head support member 73 to be changed. A magnetic head adjusting device as shown in FIG. 9 is provided at the cassette loading station E. The magnetic head adjusting device includes a fixed member 81a and a vertically movable adjusting member 82a. An adjusting screw 83a extends through the adjusting member 82a and is screwed into the chassis 70 and normally biased upwardly by a coil spring 85a. A guide plate 84is located behind the adjusting member 82a for guiding the latter.

When the head base 71 is at its rightwardly moved position in which the magnetic head 74 opposes to the right-hand cassette half $C_3$ as shown in FIG. 8, opposite end portions of the head support member 73 are engaged with the fixed member 81a and the adjusting member 82a. Thus, if the adjusting screw 83a is turned to adjust the vertical position of the adjusting member 82a, the head supporting member 73 and the magnetic head 74 are inclined toward a direction @, thereby effecting azimuth adjustment of the magnetic head 74 relative to the tape within the cassette half $C_3$.

Also a fixed member 81b and an adjusting member 82b are provided at the left-hand side cassette loading station F. The fixed member 81b and the adjusting member 82b are located at symmetrical positions with respect to a point with the fixed member 81a and the adjusting member 82a, respectively, located at the right-hand side cassette loading station E. Thus, when the head base 71 is moved to its leftward direction to its limit position if which the magnetic head 74 opposes to the tape within the cassette half $C_4$, the head support member 73 is engaged by the left-hand side fixed member 81b and adjusting member 82b. Thus, if the adjusting screw 83b is turned to adjust the vertical position of the adjusting member 82b, azimuth adjustment of the magnetic head 74 relative to the tape within the cassette half $C_4$ is effected.

It is to be noted that a magnetic head adjusting device according to the present invention can be applied not only to a double cassette tape player as in the embodiments described above but also to any arrangement of the type wherein a common magnetic head is moved.

Having now fully described the invention, it will be apparent to one of ordinary skill in the art that many changes and modifications can be made thereto without departing from the spirit and scope of the invention as set forth herein.

What is claimed is:

1. A magnetic head adjusting device for a double cassette tape player wherein a pair of cassette loading stations each including a pair of spindles and a capstan are provided on a chassis, comprising a head base mounted for movement between said cassette loading stations on said chassis, a resilient support member secured to said head base, a single magnetic head mounted on said resilient support member, and an adjusting member located at each of said cassette loading stations for adjustably changing, against the resilient force of said resilient support member, the inclination of said magnetic head moved to either one of the cassette loading stations together with said head base.

2. A magnetic head adjusting device according to claim 1, wherein said adjusting member is supported for sliding movement on an adjusting screw adjustably screwed in said chassis and normally biased in a direction away from said chassis by means of a spring.

3. A magnetic head adjusting device according to claim 2, wherein said adjusting member is guided by a guide member secured to said chassis and extends in parallel to said adjusting screw.

4. A magnetic head adjusting device according to claim 1, wherein said resilient support member has an inclined camming face formed thereon for engaging, when said head base is moved to its limit position adjacent either of said cassette loading stations, with said adjusting member to position said magnetic head thereon to its adjusted inclined position.

5. A magnetic head adjusting device according to claim 4 wherein said resilient support member is a spring plate having one end secured to said chassis, said magnetic head being mounted at an intermediate portion of said spring plate, said spring plate further having said inclined camming face formed at the other end portion thereof.

6. A magnetic head adjusting device according to claim 4, wherein said head base is mounted for sliding movement between said cassette loading stations on said chassis, and said camming face of said resilient support member has a pair of oppositely inclined camming face portions for individually engaging with the adjusting member at either of said cassette loading stations.

7. A magnetic head adjusting device according to claim 6, wherein said head base has a pinch roller mounted thereon and is moved, at each of said cassette loading stations, in a direction to contact said magnetic head with a tape within a cassette loaded at the cassette loading station and press said pinch roller against said capstan via the tape.

8. A magnetic head adjusting device according to claim 1, wherein each of the adjusting members has an inclined camming face formed thereon for engaging, when said head base is moved to its limit position adjacent either of said cassette loading stations, with said resilient support member to position said magnetic head on said resilient support member to its adjusted inclined position.

9. A magnetic head adjusting device according to claim 8, wherein said head base is mounted for sliding movement between said cassette loading stations on said chassis, and the camming face on each of the adjusting members are inclined in opposite directions.

10. A magnetic head adjusting device according to claim 8, wherein said resilient support member includes a coil spring and a head supporting member connected to one end of said coil spring and having said magnetic head mounted thereon.

11. A magnetic head adjusting device according to claim 8, wherein said resilient support member is supported for integral rotation on a rotatable member which is mounted for rotation said head base and is rotated in synchronism with sliding movement of said head base.

12. A magnetic head adjusting device according to claim 11, further comprising a fixed member located at each of said cassette loading stations and having an inclined face formed thereon for engaging, when said head base is moved to its limit position adjacent either of said cassette loading stations, with said resilient support member at a portion different from a portion at which the adjusting member engages with said resilient member.

* * * * *